United States Patent [19]
Osborne et al.

[11] 4,219,386
[45] Aug. 26, 1980

[54] PWR INTEGRAL TIE PLATE AND LOCKING MECHANISM

[75] Inventors: Jon L. Osborne, Richland; Barney S. Flora, Benton City, both of Wash.

[73] Assignee: Exxon Nuclear Company, Inc., Bellevue, Wash.

[21] Appl. No.: 805,524

[22] Filed: Jun. 10, 1977

[51] Int. Cl.² .................... G21C 3/30; F16B 39/00
[52] U.S. Cl. .................................. 176/78; 151/6; 176/76
[58] Field of Search ............ 176/76, 78; 151/14 CS, 151/6, 63; 285/92, 85, 84

[56] References Cited

U.S. PATENT DOCUMENTS

| 3,431,170 | 3/1969 | Lass | 176/78 |
| 3,953,287 | 4/1976 | Long | 176/78 |
| 3,971,575 | 7/1976 | Lesham | 285/85 |
| 3,992,259 | 11/1976 | Anthony | 176/78 |
| 4,030,975 | 6/1977 | Anthony | 176/78 |
| 4,038,137 | 7/1977 | Pugh | 176/78 |
| 4,064,004 | 12/1977 | Long | 176/78 |

Primary Examiner—Samuel W. Engle
Assistant Examiner—Donald P. Walsh
Attorney, Agent, or Firm—Ronald D. Hantman

[57] ABSTRACT

A locking mechanism for securing an upper tie plate to the tie rods of a nuclear fuel bundle. The mechanism includes an upper tie plate assembly and locking sleeves fixed to the ends of the tie rods. The tie plate is part of the upper tie plate assembly and is secured to the fuel bundle by securing the entire upper tie plate assembly to the locking sleeves fixed to the tie rods. The assembly includes, in addition to the tie plate, locking nuts for engaging the locking sleeves, retaining sleeves to operably connect the locking nuts to the assembly, a spring biased reaction plate to restrain the locking nuts in the locked position and a means to facilitate the removal of the entire assembly as a unit from the fuel bundle.

10 Claims, 8 Drawing Figures

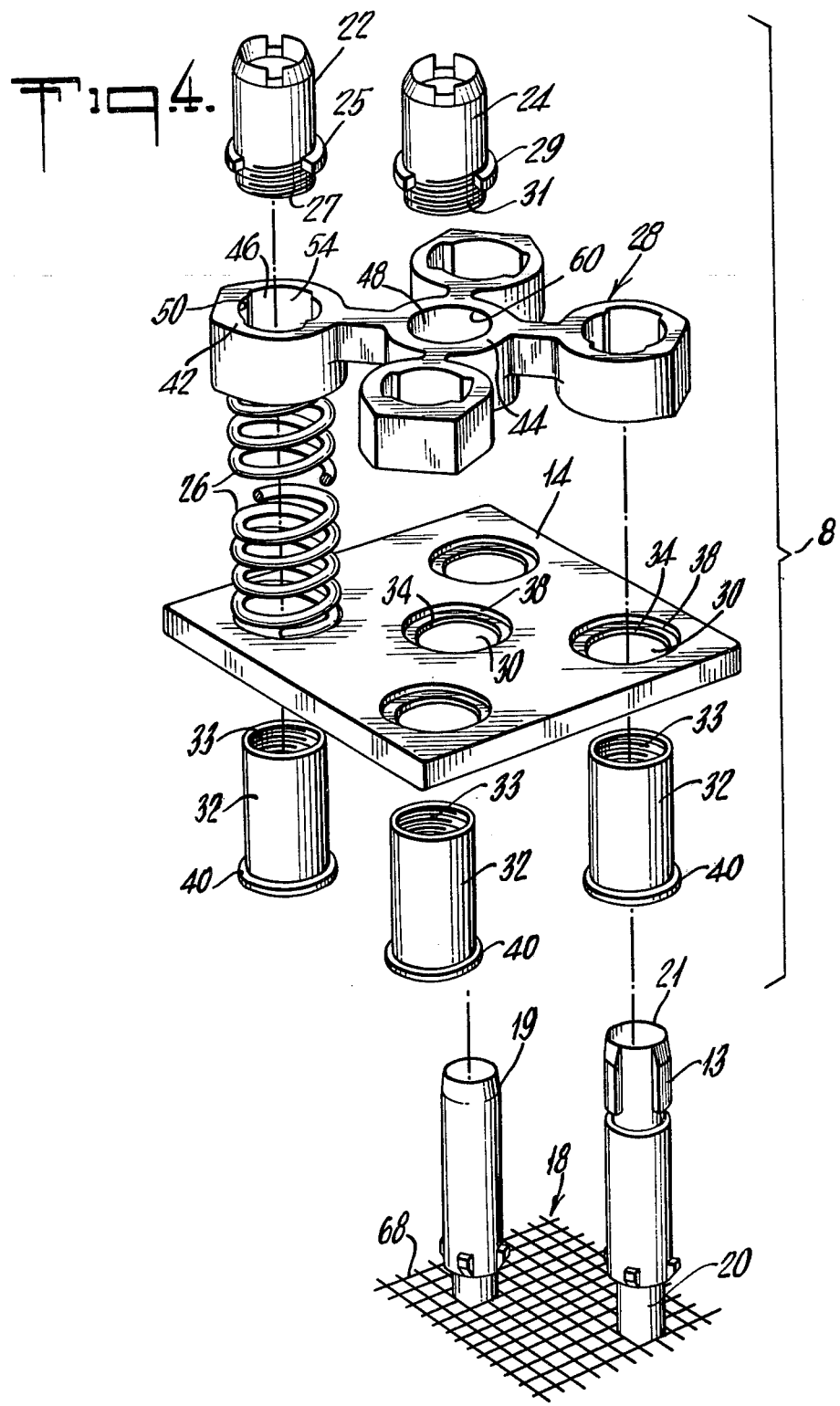

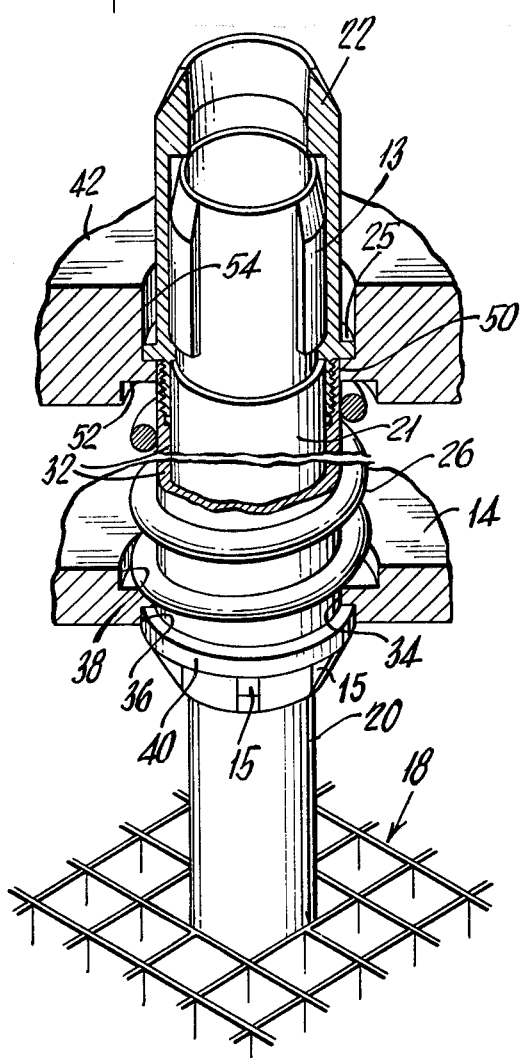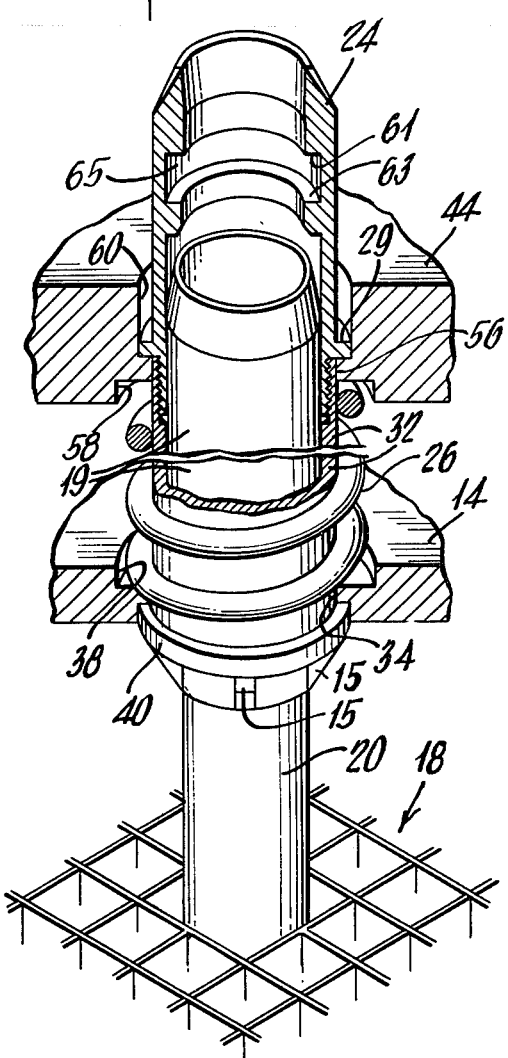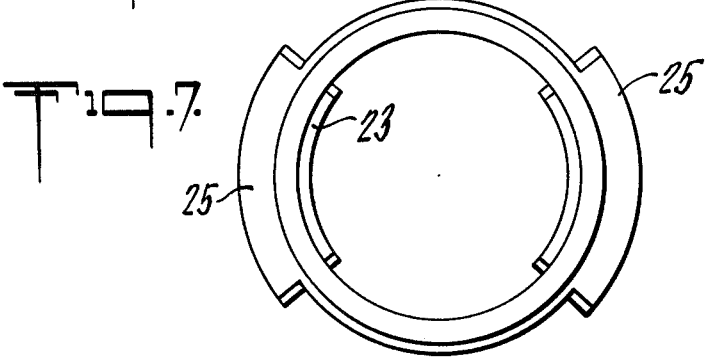

PWR INTEGRAL TIE PLATE AND LOCKING MECHANISM

BACKGROUND OF THE INVENTION

The present invention relates to nuclear power reactor fuel bundles and, in particular, to an improved apparatus for the assembly and disassembly the upper tie plate of such bundles.

In a typical nuclear power reactor, nuclear fission occurs within fuel rods which are assembled into bundles with the fuel rods in a parallel array between two tie plates. A multiplicity of fuel rods constitute the fuel core of a reactor. Heat from the nuclear fission reaction is taken up by a fluid (usually water) flowing along the outer surface of the rods. As the reactor operates, the fuel is gradually consumed, and it is necessary at periodic intervals to replace the fuel. However, only a minor fraction of the fuel rods are replaced at any one time, in order to avoid large variations in reactor operation. In the event of premature bundle failure or fuel inspection, it is necessary to remove the bundles and to disassemble them for repairs, replacement, or inspection of selected rods. Thus, the fundles may be adapted for easy disassembly by remote means, since they become highly radioactive during the operation of the reactor. Disassembly requires the removal of the upper tie plate in order to reach the fuel rods.

A number of arrangements have been disclosed in the prior art for assembling nuclear power reactor fuel bundles. See for example, U.S. Pat. Nos. 3,431,170 and 3,953,287, the latter being assigned to the same assignee as the present application. Many of the prior art arrangements, however, require the removal of relatively small parts to remove the upper tie plate which is difficult to do by remote disassembly techniques. Any system for locking fuel rods in a fuel bundle should be as simple as possible, not only to reduce the cost of the locking system employed, but also to simplify the complicated procedures for the subsequent disassembly and reassembly of the bundles under remote control conditions. The possibility of losing parts during remote disassembly make it highly desirable to provide a locking system which, preferably, need not be disassembled at any time after the initial assembly.

The structure of U.S. Pat. No. 3,953,287 avoids this difficulty, but it, as well as that of the other patent, is only applicable to fuel assemblies in which the upper tie plate is loaded by springs which push it upwardly. There is need for a design which is readily operable remotely, which avoids separable parts and which is applicable to fuel assemblies in which the upper tie plate is rigidly mounted on the tie rods which hold it in place.

U.S. Pat. No. 3,971,575 shows another arrangement for a locking device that combines a number of the parts of the locking system on one assembly.

SUMMARY OF THE INVENTION

The present invention is a locking mechanism for securing an upper tie plate to the tie rods of a nuclear fuel bundle. The locking mechanism includes an integral unit (the upper tie plate assembly) and a means for engaging the tie rods to the assembly fixed to an end of each of the tie rods.

The upper tie plate assembly, broadly includes the following elements: an upper tie plate having an inner side toward said fuel rods and an outer side away from said fuel rods, said tie plate having a plurality of openings, one of the openings receiving a corresponding one of the tie rods, such that the engaging means on the end of each of the tie rods extends beyond the tie plate on the outer side; a locking means for releasable locking engagement with the engaging means extending beyond the tie plate, the locking means exceeding the size of said openings so that said locking means is unable to pass through the openings in the upper tie plate, thereby securing the tie plate to the tie rods, the locking means being movable between a locked and unlocked position; means for operably connecting the locking means to the tie plate; and means for restraining the locking means in the locked position, the restraining means operably connection to either the upper tie plate or the locking means such that the upper tie plate, the locking means and the retaining means are removable as an integral assembly.

The tie plate is secured to the tie rods by mating engagement of the locking means and the engaging means fixed to the tie rods.

In the preferred embodiment, the engaging means is a tubular locking sleeve fixed to the tie rods having lugs on the end of the sleeve away from the fuel bundle.

BRIEF DESCRIPTION OF THE DRAWINGS

FIG. 4 is an exploded perspective view of the locking sleeves on the ends of the tie rods and the upper tie plate assembly.

FIG. 5 is a perspective sectional view partially cut away to show a tie rod secured to the upper tie plate assembly.

FIG. 6 is a perspective sectional view partially cut away to show the center tie rod and upper tie plate assembly.

FIG. 7 is a cross-section of the locking nut viewed locking into the open end.

DESCRIPTION OF THE PREFERRED EMBODIMENT

Figure 1:
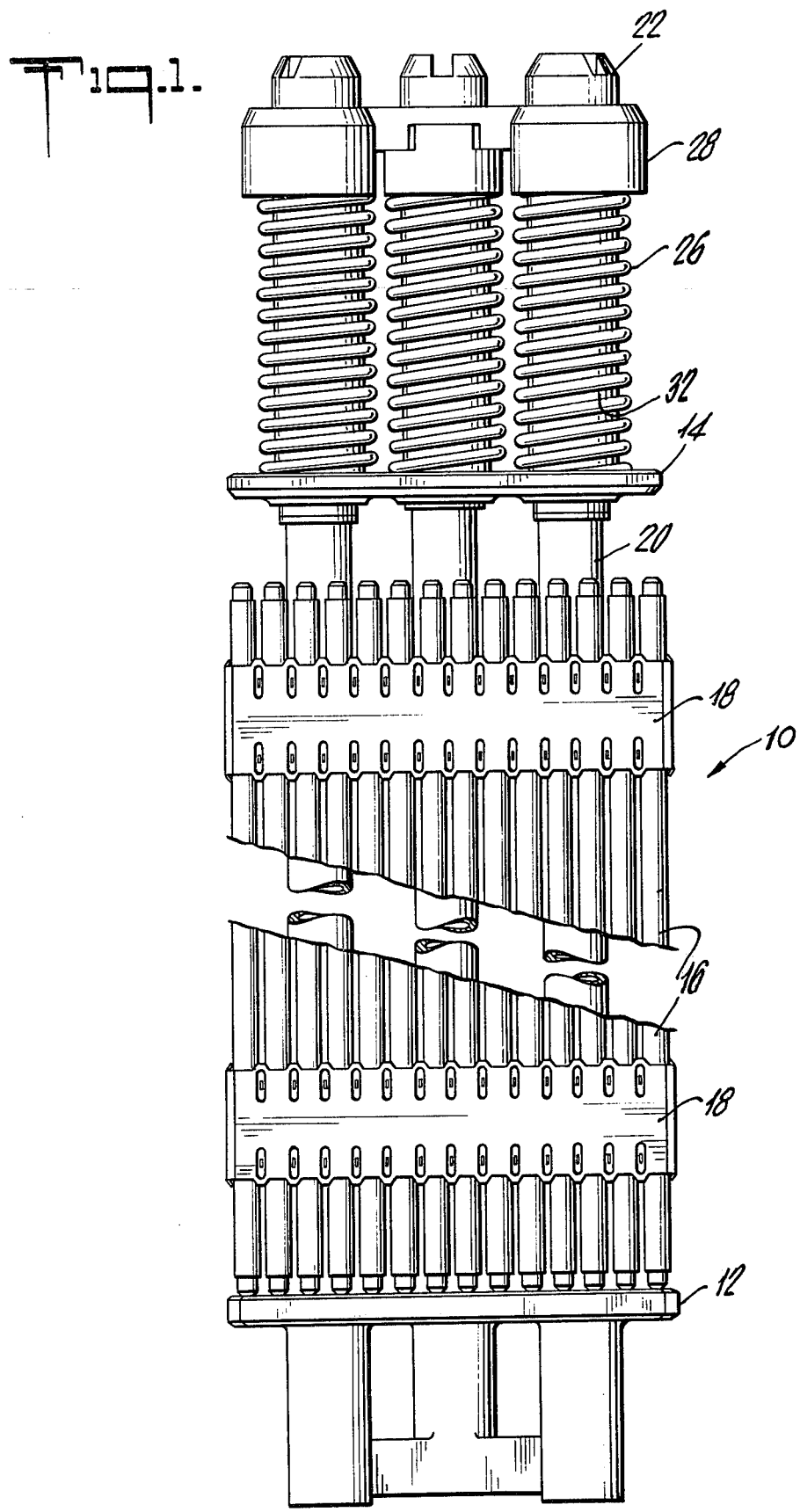
FIG. 1 is an elevational view of a fuel bundle assembled according to the present invention.

Throughout the views, same reference numerals refer to same parts.

FIG. 1 shows an overall view of a portion of an assembled nuclear fuel bundle 10. Fuel rods 16, which contain fissionable fuel consumed during the reactor operation, are suspended in parallel array between a lower tie plate 12 and an upper tie plate 14. Heat is produced by the consumption of the nuclear fuel which is transferred to water flowing between the fuel rods 16. The fuel rods 16 may be restricted in their lateral movement by fuel rod spacers 18. The fuel bundle is held together by a plurality of tie rods 20 disposed throughout the bundle and secured to the tie plates in various ways.

However, it is important to secure the tie rods 20 to the upper tie plate 14 with a locking mechanism that is easily disassembled, since the bundle cannot be handled manually after it has become radioactive by operation in a nuclear reactor.

The upper tie plate locking mechanism according to the preferred embodiment of the present invention is shown in an exploded perspective view of FIG. 4. The locking mechanism includes an integral unit (the upper tie plate assembly 8) and locking and center locking sleeves 21 and 19 fixed to the ends of the tie rods 20.

Figure 2:
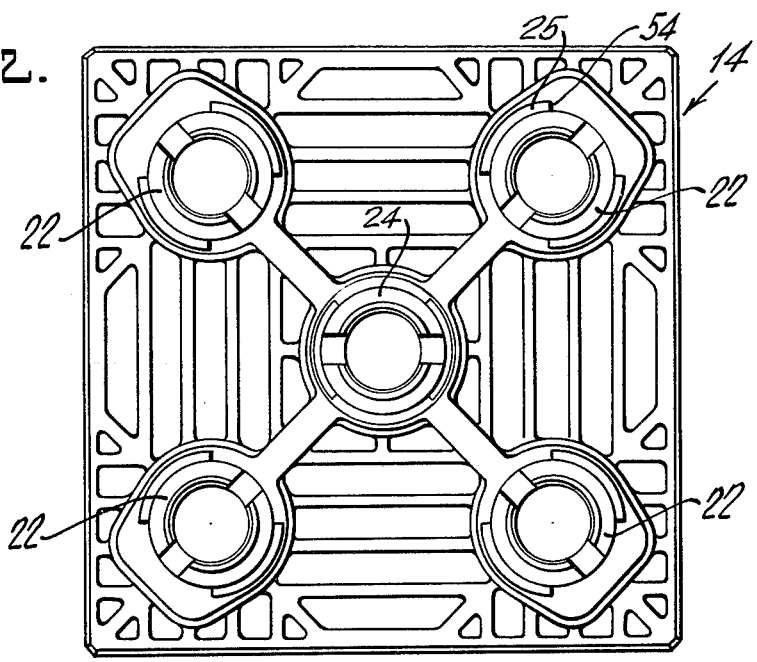
FIG. 2 is a top view of a fuel bundle assembled according to the present invention.
Figure 3:
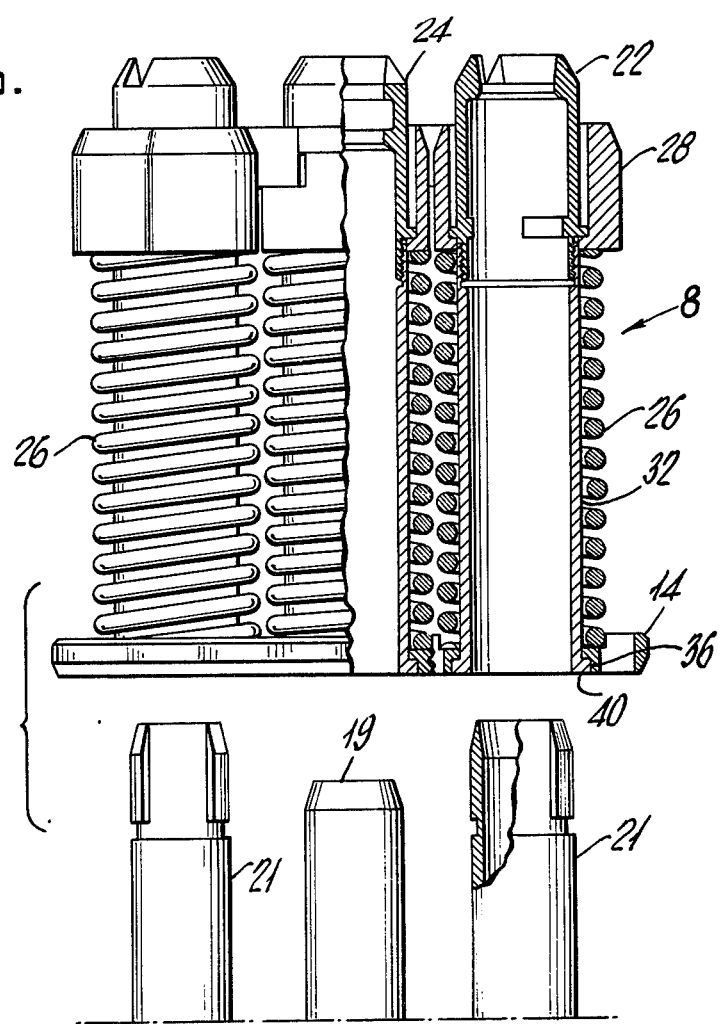
FIG. 3 is a sectional view of the upper tie plate locking assembly partially cut away to show the locking nut.

The upper tie plate assembly 8 includes the tie plate 14, locking and center locking nuts 22 and 24, retaining sleeves 32, reaction springs 26 and the reaction plate 28. The tie plate 14 is secured to the tie rods 20 by securing the upper tie plate assembly 8 to the locking sleeves 21. This is done by mating engagement of the locking nuts 22 and locking sleeves 21. When the locking nuts 22 are disengaged from the locking sleeves 21, the entire upper tie plate assembly 8 is removed as a unit. The upper tie plate assembly 8 is shown in the partially cut away view of FIG. 3. A top view is shown in FIG. 2.

The upper tie plate assembly 8 can be initially constructed as a unit and then placed onto the fuel bundle. However, fine adjustments of the assembly 8 are made after the assembly 8 is placed onto the fuel bundle as is discussed below. The principal components of the upper tie plate assembly 8 are shown in FIG. 4, a description of which follows.

The upper tie plate 14 is a substantially flat member including several openings 30 through which are inserted the retaining sleeves 32 (described below). The openings 30 are circular but have three different diameters as the opening proceeds through the tie plate 14. The opening has its smallest diameter 34 about midway through the tie plate and is of a size so as to accommodate the outer diameter of the retaining sleeves 32. On the side of the tie plate 14 towards the fuel rods 16, the diameter 36 of the opening is enlarged to allow the flange 40 of the retaining sleeve 32 to seat within the opening so that the flange 40 is flush with the surface of the side of the tie plate 14 toward the fuel rods 16. The diameter 38 of the opening on the side of the tie plate 14 away from the fuel rods 16 is also larger than the smallest diameter 34 to provide a seat for one end of the spring 26.

The retaining sleeves 32 are a means for operably connecting the locking nuts 22 and center locking nut 24 (described below) to the tie plate 14. The retaining sleeves 32 are hollow tubular members having an inner diameter capable of receiving the tubular locking sleeves 21 (described below). The retaining sleeves 32 extend through the tie plate openings 30. The end of the sleeve toward the fuel rods 16 is enlarged to form a flange 40 which exceeds the size of the tie plate openings 30 so that the sleeve 32 may not pass through the opening 30. The end 33 of the sleeve on the side of the plate 14 away from the fuel rods 16 is fixed to one end 27 of the locking nut 22. A preferred means is to thread the ends 27 and 33 together.

Helical springs 26 surround a portion of the retaining sleeves 32 and locking nuts 22 on the side of the tie plate 14 away from the fuel rods 16. The springs 26 are a means for biasing the reaction plate 28 (described below) into abutting engagement with the restraining lugs 25 included on the locking nuts 22.

The reaction plate 28 is adjacent to the helical springs 26 on the side away from the upper tie plate 14. The reaction plate 28 is a means for restraining the locking nuts 22 in a locked position. The reaction plate 28 is a multi-armed cross-shaped member in which the center of the cross 28 and the four ends of the cross 28 are enlarged into disc-shaped members to accommodate openings 46 and 48 through the reaction plate 28 producing the ring-shaped portions 42 and 44 of the cross 28. These ring-shaped portions 42 and 44 surround the locking nuts 22 and center locking nut 24 respectively. FIG. 5 shows a cut away view of a tie rod 20 secured to the upper tie plate assembly 8. FIG. 6 shows a cut away view of a center locking sleeve 19 located within the center locking nut 24 when the upper tie plate assembly 8 is secured to the tie rods 20. The openings 46 through the ends of the cross 28 are identical. The openings 46 through the ends of the cross 28 are identical. The openings 48 through the center 44 of the cross 28 are different from the openings 46. The reason for the difference will become clear when differences between the locking nuts 22 and the center locking nut 24 are explained.

The openings 46, like the tie plate openings 30, are generally circular, but have different diameters proceedings through the reaction plate 28. The smallest diameter 50 is substantially the same as the smallest diameter 34 of the opening 30 through the tie plate 14. One the side of reaction plate 28 adjacent the spring 26, the diameter 52 of the openings 46 is larger than the diameter 50 to allow the end of the spring 26 to seat within the openings 46. On the side of the reaction plate away from the spring 26, the openings 46 is expanded radially outward to provide two retaining slots 54. The retaining slots 54 are diametrically opposed and extend partially through the arms of the reaction plate 28 beginning from the surface of the reaction plate 28 away from the tie plate 14. The retaining slots 54 terminate before traversing the entire width of the opening have diameter 50. Therefore, a circular portion of the openings 46 through the reaction plate 28 will remain having a diameter 50.

The center opening 48 is also circular and has different diameters proceedings through the reaction plate 28. Like the openings 46, the smallest diameter 56 of the center opening 48 is substantially the same as the smallest diameter 34 of the openings 30 through the tie plate 14. Also like the openings 46, the diameter 58 (see FIG. 6) of the opening 48 on the side of the reaction plate 28 adjacent the spring 26 is larger than the diameter 56 to allow the end of the spring 26 to seat within the openings 48. Unlike the openings 46, however, on the side of the reaction plate away from the spring 26, the openings 48 is expanded radially outward to provide a portion of the opening 48 with a larger diameter 56. The larger diameter 60 portion of the opening 48 extends from the surface of the reaction plate 28 away from the tie plate and terminates before traversing the entire width of the opening having diameter 56. Therefore, a portion of the opening 48 through the reaction plate will remain having a diameter 56. Thus, the center opening 48 differs from the opening 46 through the ends of the cross 28 in that, although the portion of the opening 48 having the diameter 60 has been expanded radially outward substantially the same amount as the retaining slots 54, the radially expanded portion of the opening 48 extends around the entire periphery of the opening 48 while the radially expanded retaining slots 54 of the openings 46 do not.

Locking nuts 22 are a means for releasable locking engagement with the locking sleeves 21 (described below). The locking nuts 22 are hollow tubular caps capable of receiving the locking sleeves 21. One end 27 of the nut 22 is threaded into the threaded end 33 of the retaining sleeves 32. Lugs 23 (see FIG. 7) project radially inward from the interior walls of the cap and are spaced about the periphery of the cap to correspond to the sleeve lugs 13 (described in more detail below). Restraining lugs 25 project radially outward from the exterior of the nut 22. The number and shape of the restraining lugs 25 corresponds to the number and shape of the retaining slots 54 in the reaction plate 28.

The locking nuts 22 extend through the openings 46 of the reaction plate 28 which is positioned with the opening 46 between the tie plate 14 and the restraining lugs 25. The locking nuts 22 with the restraining lugs 25 are too large to pass through the openings 46 in the reaction plate 28 so that the reaction plate is prevented from being separated from the upper tie plate assembly 24. When the locking nuts 22 are in locking engagement with the locking sleeves 21, the restraining lugs 25 reside in the restraining slots 54.

After the completed upper tie plate assembly 8 is assembled and the unit placed on the completed fuel bundle 10, the amount that the locking nuts 22 and center locking nuts 24 are threaded into the retaining sleeves 32 may be adjusted and, thereafter, the threaded portions may be permanently fixed together by some conventional means such as welding to prevent subsequent undesirable movement.

The locking sleeves 21, which are tubular members fixed to one end of the tie rods 20, are a means for engaging the locking nuts 22. The locking sleeves 21 are concentric with the tie rods 20. In the preferred embodiment, four sleeves 21 are used although other numbers may be employed. Any convention method for fixing the sleeves 21 to the tie rods 20 may be used. Sleeve lugs 13 project radially outward and are spaced in increments about the periphery of the locking sleeves 21 (discussed in more detail below). The sleeves 21 also include plate rests 15 projecting radially outward and spaced around the periphery in about 90° increments about the end of the sleeves 21 toward the fuel bundle. The end of the sleeves 21 enlarged by the plate rests are too large to enter the openings 30 in the tie plate. When the fuel bundle is fully assembled, the locking sleeves 21 are inserted into the retaining sleeves 32 so that the flanges 40 are in contact with the plate rests 15 and the entire upper tie plate assembly 8 rests on the plate rests 15.

The assembled upper tie plate assembly 8 is secured to the fuel bundle by the mating engagement of the locking nuts 22 and the locking sleeves 21. The locking sleeves 21 include two sleeve lugs 13 extending radially outward from the periphery of the locking sleeve 21 near the end of the sleeve opposite that of the plate rests 15. The sleeve lugs 13 which are arc-shaped are diametrically opposed and extend about the periphery of the locking sleeve 21 subtending an angle of about 90° thus leaving about 90° increments between the sleeve lugs 13. The locking nuts 22 include two locking lugs 23 extending radially inward from the inside surface of the locking nut 22. The locking lugs 23 are arc-shaped segments and diametrically opposed. Proceeding about longitudinal axis of the locking nut 22 on the inside surface, the locking lugs 23 subtend an angle of about 90° with about 90° increments between the lugs 23. The radial distance of the locking lugs 23 from the longitudinal axis of the locking nut 22 is the same as the radial distance of the sleeve lugs 13 from the longitudinal axis of the locking sleeve 21. Therefore, the locking nuts 22 may be locked to the locking sleeves 21 by positioning the locking sleeves 21 within the locking nuts 22 so that the locking lugs 23 are adjacent to the sleeve lugs 13 on the side of the sleeve lugs 13 toward the fuel bundle. FIG. 7 shows a cross-sectional view of the locking nut 22 showing the locking lugs 23 and restraining lugs 25.

When the upper tie plate assembly 8 is secured to the fuel bundle by the mating engagement of the locking nuts 22 and the locking sleeves 21, the restraining lugs 25 are located within the restraining slots 54. The springs 26 bias the reaction plate 28 so that it is in contact with the restraining lugs 25. The assembly may be removed by compressing the springs 26 and bringing the reaction plate 28 closer to the tie plate 14 until the restraining lugs 25 are clear of the reaction plate 28. Then the lugs 25 are no longer within the restraining slots 54 and may be rotated about their longitudinal axis and unlocked from the locking sleeves 21. The retaining sleeves 32 being fixed to the locking nuts 22 will rotate with the locking nuts 22 after the locking nuts 22 are unlocked from the locking sleeves 21, the entire upper tie plate assembly 8 may be removed as a unit.

The upper tie plate assembly 24 includes a means for facilitating the compression of the reaction plate 28 and the upper tie plate 14 against the bias of the springs 26. The faciliating means includes a center locking nut 23 and a center retaining sleeve. The center retaining sleeve has the same structure and is located through the openings 30 in the tie plate 14 in the same manner as the other retaining sleeves 32 and also will be referenced with the same numeral 32.

The center locking nut 24 is a hollow tubular member having projections extending radially outward from the exterior of the center nut 24. The projections may be lugs 29 similar to the restraining lugs 25 on the locking nuts 22. An alternative to the lugs 29 could be a rim extending radially outward the same distance as the lugs 29 but encircling the entire center locking nut 24. The center nut 24 extends through the center opening or bore 48 of the reaction plate 28. When the assembly is secured in the tie rods, the lugs 29 (or rim) are located within the opening having diameter 60 away. The maximum diameter of the center locking nut 24 including the lugs 29 exceeds the diameter 56 and so the nut 24 is unable to pass through the smaller diameter 56 of the opening 48. An end 31 of the center locking nut 24 is threaded into the threaded end 33 of the retaining sleeve 32. After assembly the threaded ends may be permanently fixed together in a similar manner as to the other locking nuts 22 and retaining sleeves 32. A Helical spring 26 surrounds a portion of the retaining sleeves 32 and center locking nut 24 between the tie plate 14 and reaction plate 28.

The center locking sleeve 19 differs from the locking sleeves 21 in that it lacks the sleeve lugs 13. In the assembled position, the center locking sleeve 19 is located within the retaining sleeve 32 and center locking nut 24, but is not engaged to the sleeve 32 and locking nut 24. Therefore, the center locking nut 24 need not be disengaged from a tie rod 20 before the upper tie plate assembly 8 is removed from the fuel bundle.

The center locking nut 24 includes a restricted portion 65 at the end away from the fuel bundle. The restricted portion is formed by decreasing the internal diameter of the tubular locking nut by two longitudinally spaced ribs 61 and 63. The restricted portion 65 provides a means of gripping the center nut 24 while exerting pressure on the reaction plate and thereby bringing the tie plate 14 and reaction plate 28 together.

Figure 8:
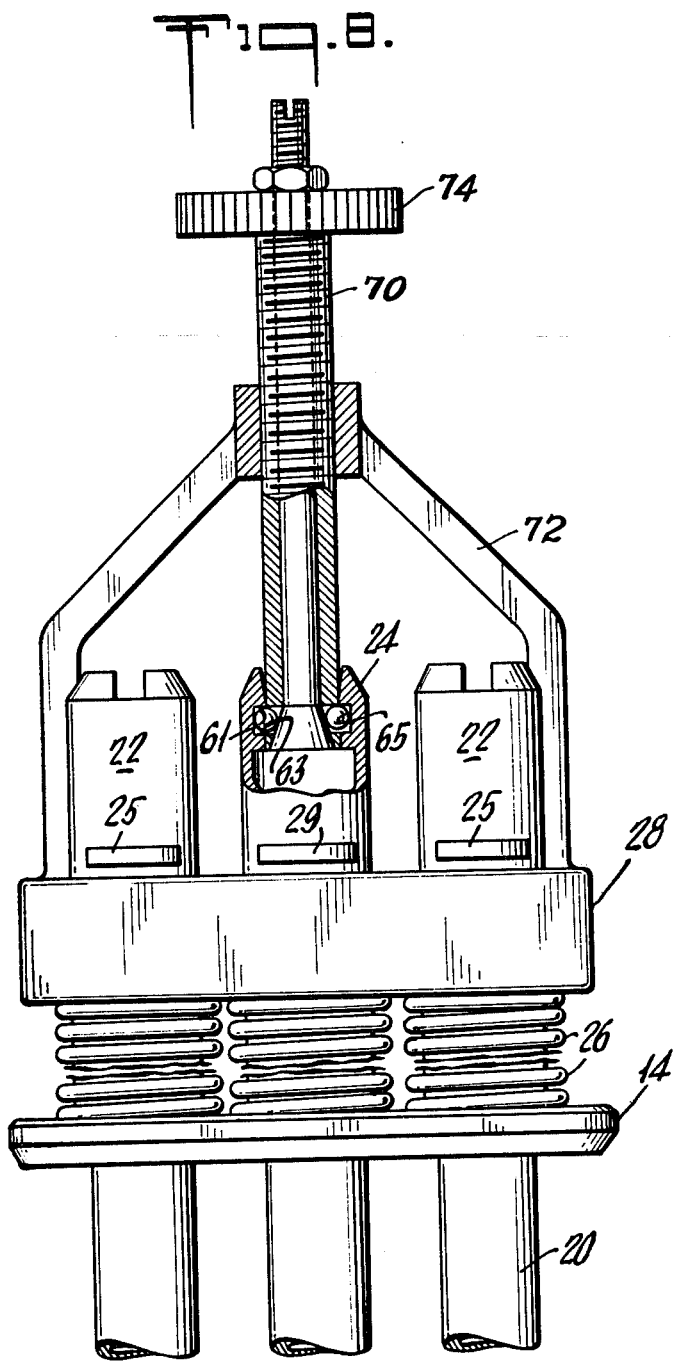
FIG. 8 is an elevational view of the compressed upper tie plate assembly disengaged from the locking sleeves together with a schematic representation of the compressing tool.

FIG. 8 shows the upper tie plate assembly in the compressed position along with a schematic outline of a tool capable of compressing the plates. The center nut 24 is gripped by the center shaft 70 of the tool and by turning the knob 74 the legs 72 and, hence, the reaction plate 28, move relative to the center shaft 70. The tie plate 14 is bounded by the flange 40 and, therefore, moving the reaction plate 28 brings the reaction plate 28 and tie plate 14 closer together. Then the locking nuts 22 may be unlocked from the locking sleeves 21 and the upper tie plate assembly 8 may be removed.

What is claimed is:

1. In the nuclear power reactor fuel bundle having a plurality of the fuel rods and tie rods, an upper tie plate locking mechanism, comprising:
   (a) a tubular locking sleeve fixed to an end of a plurality of said tie rods, said locking sleeves including sleeve lugs projecting radially outward and spaced in increments about the periphery of said locking sleeve at an end away from said fuel bundle;
   (b) an upper tie plate having a plurality of openings, one of said openings receiving each of said locking sleeves, such that said sleeve lugs on said locking sleeves extend beyond the tie plate on the side away from said fuel rods;
   (c) locking nuts corresponding to each of said locking sleeves, said locking nuts including a hollow tubular cap capable of receiving said locking sleeves with lugs projecting radially inward from the interior walls of said cap, said cap lugs spaced about the periphery of said cap and corresponding to said sleeve lugs for mating engagement, said locking nuts movable between a locked and unlocked position;
   (d) a retaining sleeve including a hollow tubular member capable of receiving said locking sleeve and extending through said openings on both sides of said tie plate, said tubular member having an enlarged end toward said fuel bundle so that said enlarged end may not pass through said openings of said tie plate, said retaining sleeve fixed at the end away from said fuel bundle to said nut, thereby operably connecting said locking nut to said tie plate; and
   (e) means for restraining said locking nuts in said locked position, said restraining means operably connected to one of said retaining sleeve and said locking nuts such that said upper tie plate, said locking, nuts said retaining sleeve and said restraining means form an integral unit when said locking nuts is in said locked and said unlocked position and are removable from said fuel bundle as as integral assembly.

2. The upper tie plate locking mechanism of claim 1 in which said locking sleeve extends through said openings on both said inner and said outer sides of said tie plate and includes sleeve plate rests at the end of said locking sleeve towards said fuel rods, said sleeve plate rests being on said inner side of said tie plate, said plate rests spaced about the periphery of said sleeve and extending radially outward such that said plate rests exceed the size of said openings and cannot pass through said openings of said tie plate.

3. The upper tie plate locking mechanism of claim 1 in which said openings are substantially circular bores having different diameters proceeding through said tie plate.

4. The upper tie plate locking mechanism of claim 1 in which said restraining means comprises:
   (a) a reaction plate having an inner side toward said fuel bundle and an outer side away from said fuel bundle, said plate including a multi-armed member having an opening in each of said arms, one of said arms corresponding to one of said locking nuts, said openings including radially outward retaining slots extending from said outer side of said arm partially through said arm, each of said slots corresponding to one of said restraining lugs so that said restraining lugs reside in said slots when said locking sleeves for restraining the rotational movement of said restraining lugs, said multi-armed member operably connected to said locking nut, said locking nut extending through said opening with each of said openings in said arms positioned between said tie plate and said restraining lugs, said restraining lugs exceeding the size of said opening in said arms such that said lugs are unable to pass through said opening in said arms so as to restrict said reaction plate from being separate from said upper tie plate assembly; and
   (b) spring means for biasing said reaction plate into abutting engagement with said restraining lugs.

5. The upper tie plate locking mechanism of claim 4 in which said spring means comprises a helical spring surrounding a portion of each of said locking nuts and retaining sleeves and located between said upper tie plate and said reaction plate.

6. The upper tie plate locking mechanism of claim 5 in which said reaction plate has the configuration of a cross-shaped member.

7. The upper tie plate locking mechanism of claim 6 further comprising means for facilitating the compression of said reaction plate and said upper tie plate against the bias of said springs.

8. The upper tie plate locking mechanism of claim 7 in which said facilitating means comprises:
   (a) a center opening through the center of said cross-shaped reaction plate;
   (b) a center nut including a hollow tubular member having projections extending radially outward from the exterior of said center nut, said center nut extending through said center opening with said projections on the outer side of said reaction plate, said projections exceeding the size of said center opening and unable to pass through said center opening, said tubular member including a restricted portion at an end away from said fuel bundle; and
   (c) a center retaining sleeve including a hollow tubular member and extending through said opening on both inner and outer sides of said tie plate, said tubular member having an enlarged end toward said fuel bundle so that said enlarged end may not pass through said opening on both sides of said tie plate, said tubular member having an enlarged end on said inner side of said tie plate, said enlarged end exceeding the size of said center opening so that said enlarged end may not pass through said opening of said tie plate, said center retaining sleeve fixed at the end away from said fuel bundle to said center locking nut.

9. The upper tie plate locking mechanism of claim 7 in which said restricted portion includes a section of said tubular member bounded by two ribs extending radially inwardly from an inside wall of said hollow tubular member, said ribs longitudinally separated along said tubular member.

10. The upper tie plate locking mechanism of claim 7 further comprising a center locking sleeve fixed to an end of one of said tie rods said center locking sleeve extending through said tie plate and located within said center locking nut when said locking nuts and said locking sleeves are in said locked position.

* * * * *